Dec. 15, 1970 K. C. ALLEN ET AL 3,548,163

WEIGHING SCALES

Filed May 16, 1966 2 Sheets-Sheet 1

INVENTORS
KENNETH C. ALLEN &
EDWIN E. BOSHINSKI
BY
Marechal, Biebel, French & Bugg
ATTORNEYS

INVENTORS
KENNETH C. ALLEN &
EDWIN E. BOSHINSKI

United States Patent Office 3,548,163

Patented Dec. 15, 1970

3,548,163

WEIGHING SCALES

Kenneth C. Allen and Edwin E. Boshinski, Dayton, Ohio, assignors to The Hobart Manufacturing Company, Troy, Ohio, a corporation of Ohio Filed May 16, 1966, Ser. No. 550,293

Int. Cl. G06m *3/06*

U.S. Cl. 235—92 5 Claims

ABSTRACT OF THE DISCLOSURE

In a computing system including a plurality of decimal pulse counters for temporarily storing digital values to be recorded and a register member corresponding to each counter, transmission of digital information to each register member from its associated counter is controlled by means of a scanner mounted for movement through a cycle of positions corresponding to the digits from 9 to 0. Pulse generating means transmit a single pulse to all counters in response to movement of the scanner from each position to the next, causing corresponding digital advance of the counters. Each counter emits a carry pulse as it reaches its zero position, and emission of this carry pulse effects setting of the associated register member to the digit position which was occupied by the counter at the start of the scanner cycle.

This invention relates to computing and printing scale systems, and in particular it relates to an improvement on the scale system shown in our pending application Ser. No. 422,730, filed Dec. 31, 1964, hereinafter referred to as Case A.

The computing and printing scale system disclosed in Case A includes a printer incorporating a scanner having ten cooperating relatively movable contacts. The electric circuits in which the scanner and contacts are connected are such that each time the scanner shifts from one contact to the next, a pulse is transmitted to each of the associated storage counters for weight and value digit information for the purpose of causing the counters to advance one digit position. In addition, the circuitry is such that when each counter reaches its zero position, it effects setting of its associated register member in the printer. Case A includes novel circuitry associated with the scanner and its contacts such that only one pulse will be transmitted through each contact irrespective of possible bouncing of the scanner or the presence of dirt on the contacts.

The present invention is related to the same portion of the structure and circuitry of Case A as just described, and the primary object of the invention is to provide improved structure and circuitry for the same purpose which will make it possible to eliminate mechanical contacts and physical engagement with the scanner, as well as to simplify the associated circuitry as compared with Case A.

This basic object of the present invention is accomplished by means of a scanner construction and circuit arrangement such that during its operating cycle, the scanner produces the desired sequence of pulses by periodic interruption of a light beam arranged to illuminate a photocell, the successive pulses being produced by means of the periodic activation and deactivation of the photocell.

Other objects and advantages of the invention will be apparent from the following description, the accompanying drawing and the appended claims.

In the drawing—

Figures 1, 2, 3:
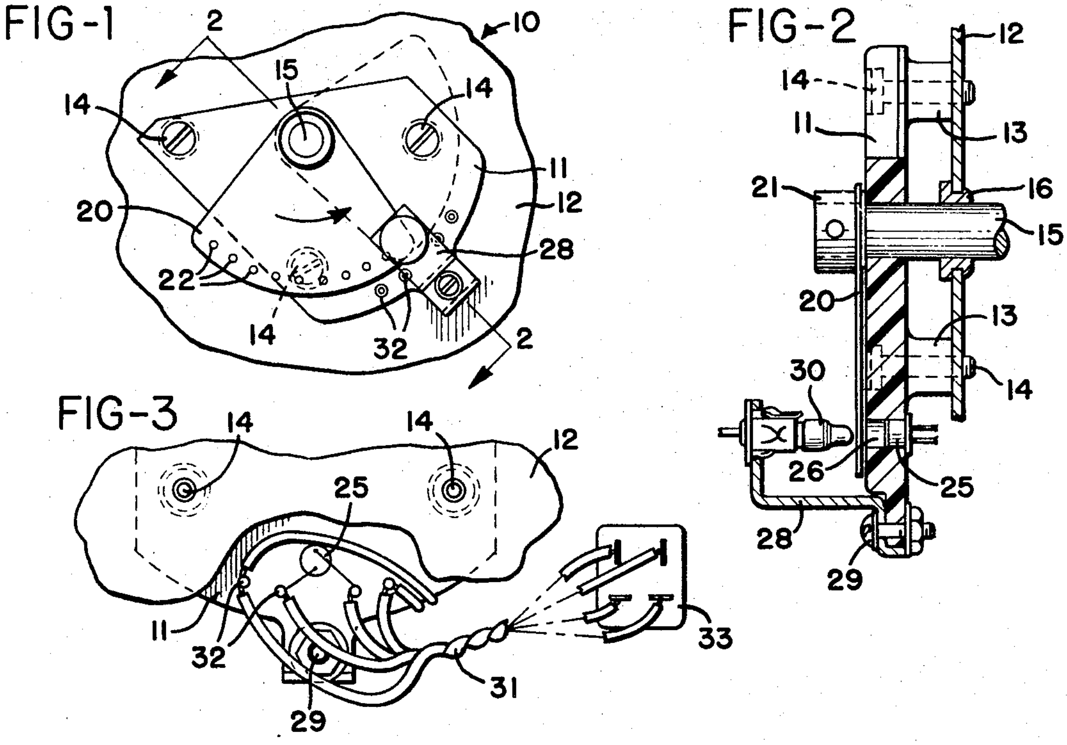
FIG. 1 is a fragmentary view in side elevation showing the scanner and associated structure of the invention.
FIG. 2 is a section on the line 2—2 of FIG. 1.
FIG. 3 is a fragmentary view looking from right to left in FIG. 2.

The drawings illustrate a preferred embodiment of the invention, and show all parts which are significantly different from the corresponding elements in Case A, and in Allen Patent No. 2,948,465 which shows in detail the register-printer incorporated in the system of Case A. Accordingly, all parts in the drawings which correspond to similar parts in Case A have been given the same reference characters. The majority of the elements in FIG. 4 which are also in Case A will be found in FIG. 13 of Case A, and the same electrical symbols are used.

Referring first to the mechanical parts illustrated in the drawing, FIGS. 1 and 2 show at 10 a fragment of the register-printer identified as 30 in Case A and 40 in Allen Pat. 2,948,465. A switch plate 11 of non-conducting material is mounted on side plate 12 of the register-printer by means of its boss portions 13 and screws 14. The shaft 15 which projects through a bushing 16 in the frame plate 12 and through switch plate 11 corresponds to the shaft 175 in Patent 2,948,465, and on its outer end is mounted the fan-shaped scanner 20 which corresponds in function to the scanner 300 in Pat. 2,948,465 and the scanner 77 in Case A.

The scanner 20 includes a mounting collar 21 and the remainder thereof is a thin plate provided near its outer periphery with a row of nine small holes 22 arranged in an arc centered on the shaft 15. During its operating cycle, the scanner 20 moves forward and back through an arc indicated by the full and dotted line positions in FIG. 1, and during this movement, the holes 22 register successively with a photocell 25 mounted in a bore 26 in the switch plate 11. A bracket 28 is bolted at 29 on the switch plate 11 and forms a mounting for a lamp 30 in line with the photocell 25 for the purpose of illuminating the photocell through each of the successive holes 22. FIG. 3 illustrates fragmentarily the electric leads 31 for the photocell 25 and lamp 30, which are readily connected by terminal pins 32 mounted in plate 11 and are provided at their other ends with a suitable plug 33.

Figure 4:
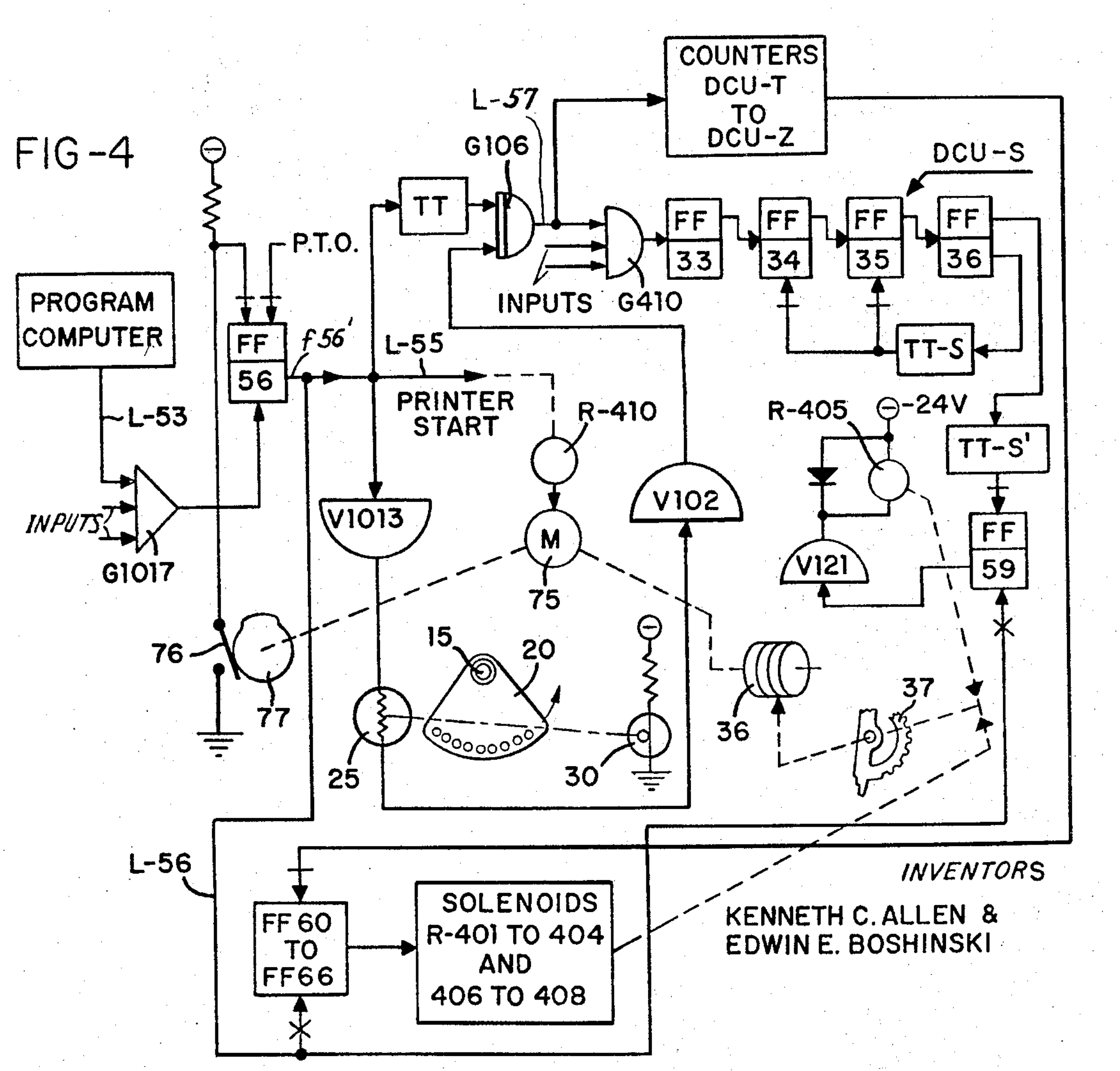
FIG. 4 is a logic diagram in accordance with the invention.

The register-printer 10 includes register members represented by the type wheels 36, and as indicated by dotted lines in FIG. 4, all the mechanical parts of the printer-register 10, including the scanner shaft 15 and the type wheels 36, are driven by a motor 75 having the same reference character in Case A. The solenoid R–405 is one of this series of key solenoids R–401 to R–408 in Case A which correspond to the solenoids 285 in Pat. 2,948,465 and which operate during the cycle of printer motor 75 to effect setting of the type wheels 36 through an intermediate system of sectors as represented at 37 in FIG. 4, and as described in detail in Pat. 2,948,465. The switch 76 shown in Case A and its operating cam 78 is driven by motor 75 in timed relation with the cycle of the scanner 20. The solenoid R–410 in FIG. 4 corresponds to the similarly numbered part in Case A which operates the starting switch for the printer motor 75.

As described in detail in Case A, the complete system includes a photoelectric weighting scale, and the cycle begins when a motion detector forming a part of the overall circuitry gives a signal of no motion indicating that the scale has come to balance. All subsequent stages of the cycle are controlled by a program counter which normally rests in home position during weighing. Then after the balance signal is received, the program counter moves through the successive stages of its cycle, during which the balance position of the scale is read out photoelectrically, the weight digits are temporarily stored in storage counters DCU–W to DCU–Z, the value is computed, and the value digits are temporarily stored in the storage counters DCU–S to DCU–V. The present invention is concerned only with the final stages of the cycle, when the digital information of weight and value is transferred to the register members of the register-printer for recording, which has a negative output if any of its inputs is positive. A typical storage counter, DCU–S, is shown as comprising four flip-flops and a feed back circuit cooperating to form a decimal counting unit. The details of the balance of the system of Case A are unnecessary to understanding of the present invention, and it need only be noted that when the recording portion of the complete cycle is ready to begin, all of the storage counters have been set with the proper weight and value information. The output *f*–56′ of flip-flop FF–56 is negative at this time, so that line L–56 is supplying negative voltage to the series of flip-flops FF–59 to FF–66 to hold them in the resulting condition irrespective of other inputs thereto. These conditions are represented in FIG. 4 by the barred inputs of flip-flops FF–56 and by the inputs having an *x* thereon to flip-flops FF–59 to FF–66.

Gate G1017 controls the start of the recording portion of the complete cycle, and it is a plus NAND gate which has a negative output when all of its inputs are positive. When this stage of the cycle is ready to begin, the recording cycle is initiated by a positive signal from the program counter on line L–53. With all inputs positive to gate G1017, which is the normal condition at this stage, the resulting negative signal to flip-flop FF–56 causes its output *f*56′ to emit a positive signal which will accomplish four results. The first result will be a positive signal on line L–55 which, as indicated by dotted lines, will result in energizing solenoid R410 and causing it to close the starting circuit for the printer motor 75, which will then run for its complete cycle as described in Pat. 2,948,465.

The second result of the positive signal from output *f*56′ is that it removes the negative voltage on line L–56 which had been holding flip-flops FF–59 to FF–66 so that they will be in condition to emit energizing signals to their associated solenoids (represented by R405) when caused to do so by their associated storage counters.

The third result of the positive signal from output *f*56′ is to provide negative voltage through inverter V1013 to photocell 25. In its home position, which corresponds to the digit "9," however, scanner 20 cuts off the light path to photocell 25 from lamp 30 so that the photocell remains non-conducting.

The third result of the positive signal from output *f*56′ is to cause a positive signal to be applied through the associated time trigger in FIG. 4 to plus NOR gate G106. The resulting negative signal on line L–57 is transmitted to each of the storage counters for weight and value through the minus NOR gate which immediately precedes each counter, represented by gate G410 for counter DCU–S and which has a positive output if any of its inputs is negative. This pulse causes each of the storage counters to advance one count from the state to which it had previously been set during the storage operations.

When any of the storage counters advances to "0," it issues a carry pulse in the same manner as when it is counting in the normal manner. Thus if counter DCU–S had been set to "9," the initial signal on line L–57 will advance it to "0," and the resulting carry pulse will be applied to its associated flip-flop FF–59 through time trigger TT–S′. The resulting negative signal on output *f*59′ is changed to positive by the inverter-amplifier V121, and it thereby completes an energizing circuit for the solenoid R405, which is the solenoid controlling the setting of the type wheel 36 in the printer for printing tens of dollars.

During the first part of the cycle of the printer motor 75, the scanner 20 rotates through an arc sufficient to move each of the holes 22 through the light beam from lamp 30, namely an arc of about 90°. As each hole 22 registers with the light beam, photocell 25 will become active, and the resulting negative signal will be changed to positive by inverter V102 and delivered to gate G106. This will in turn produce an additional negative pulse on line L–57 corresponding to the passage of each hole 22 through the light beam, and corresponding to the successive digits from "8" to "0." All storage counters will therefore again move through a single count for each pulse on line L–57, and when each one of the storage counters reaches its "0" position, it will cause energizing of the associated one of key solenoids R401–408 in the manner described.

As described in Pat. 2,948,564, the key solenoids latch to their associated sectors 37 during the forward movement of the scanner 20, and the type wheels 36 in the printer which correspond to the respective storage counters are set during the return movement of the scanner to its home position. After all holes 22 have moved between the lamp 30 and photocell 25, and before the scanner reverses its direction of movement to return to its home position, the arrangement of cam 88 is such that it closes switch 76. This grounds the negative voltage to flip-flop FF–56 and thereby restores it to its original condition and changes its output *f*56′ to negative. Since the output of inverter V1013 is now positive, photocell 25 cannot generate a negative signal to inverter V102 even when it is illuminated periodically during the return movement of scanner 20. Also, the resulting negative signal on line L–56 resets flip-flops FF–59 to FF–66 and thereby deenergizes all of the associated solenoids R401–408 in order to be clear of the sectors 37 when they mechanically position the type wheels 36 as described in Pat. 2,948,465.

The remainder of the cycle of the printer-register continues in substantially the manner described in Case A and in Pats. 2,948,465 and 2,948,466. This includes ejection of the printed ticket or label and the setting up of an interlock as described in Pat. 2,948,466 which prevents the start of a new computer cycle until the label has been removed in the normally intended manner. Thereafter, a new cycle can be carried out by placing a new load on the platter, or a repeat cycle can be carried out in the same manner described in Case A.

In summary, the novel scanner structure and circuitry of the present invention provides all the advantages of the system of Case A together with additional features and advantages, including simplicity of construction, the elimination of some parts necessary for the same functions in Case A, and particularly the elimination of mechanical contacts and their related maintenance problems.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a computing system including a plurality of pulse counters for temporarily storing values to be recorded and a plurality of register members each corresponding to that of said counters, improved circuit means for causing said register members to be set to the respective digit positions represented by the values previously stored in said counters, comprising a scanner mounted for movement through a cycle of positions corresponding respectively to the digits from "9" to "0," one of said positions constituting a home position for said scanner, means effective in the home position of said scanner for initiating said cycle thereof following completion of the storage operations of said counters and for effecting transmission of a single pulse to all of said counters, means for driving said scanner through said cycle, pulse generating means for effecting transmission of a single additional pulse to all of said counters in response to movement of said scanner from each said position to the next in order to cause each of said counters to advance one digit position as said scanner advances from one position to the next and thereby to cause each said counter to emit a carry pulse as it reaches its "0" position, and means responsive to emission of a carry pulse by any one of said counters for effecting setting of the associated said register member to the digital position occupied by said counter at the start of said scanner cycle.

2. The combination defined in claim 1 wherein said pulse generating means includes photosensitive means.

3. The combination defined in claim 1 wherein said pulse generating means includes a photocell and means for directing a light beam toward said photocell, and wherein said scanner is constructed and arranged to interrupt said beam temporarily as said scanner passes through each said position in said cycle thereof.

4. The combination defined in claim 3 wherein said scanner is provided with nine holes therethrough and is constructed and arranged to position said holes successively in line with said light beam as said scanner moves through said cycle thereof.

5. The combination defined in claim 1 wherein said cycle of said scanner includes return movement through the same said cycle of positions, and comprising means effective during said return movement of said scanner for preventing transmission of pulses to said counters.

References Cited

UNITED STATES PATENTS

| | | | |
|---|---|---|---|
| 3,055,585 | 9/1962 | Bell | 235—160 |
| 3,392,270 | 7/1968 | Boucke | 235—92(6) |

MAYNARD R. WILBUR, Primary Examiner

ROBERT F. GNUSE, Assistant Examiner

U.S. Cl. X.R.

235—151.33

PO-1050
(5/69)

UNITED STATES PATENT OFFICE
CERTIFICATE OF CORRECTION

Patent No. 3,548,163 Dated December 15, 1970

Inventor(s) Kenneth C. Allen and Edwin E. Boshinski

It is certified that error appears in the above-identified patent and that said Letters Patent are hereby corrected as shown below:

Column 2, line 50, "this" should be --the--.
Column 2, line 56, following "76" insert --is the same cam operated switch 76--.
Column 3, line 6, at the end of the line change the comma to a peri
line 7, delete; and line 8 begin a new paragraph;
line 48, "third" should be --fourth--;
line 51, change the period to a comma and insert --whic has a negative output if any of its inputs is positive.--.
Column 5, line 3, following the comma cancel the remainder of the claim and rewrite as follows:

--means including a solenoid associated with each of said counters and the corresponding said register member controlling the setting of said register member, and means responsive to emission of a carry pulse by any one of said counters for operating the associated said solenoid to effect setting of the corresponding said register member to the digital position occupied by said one counter at the start of said scanner cycle.--

Signed and sealed this 8th day of June 1971.

(SEAL)
Attest:

EDWARD M.FLETCHER,JR.
Attesting Officer

WILLIAM E. SCHUYLER, JR.
Commissioner of Patents